(12) United States Patent
Gray et al.

(10) Patent No.: US 11,661,214 B2
(45) Date of Patent: May 30, 2023

(54) SYSTEMS AND METHODS FOR AIR REVITALIZATION

(71) Applicant: The Boeing Company, Chicago, IL (US)

(72) Inventors: John Charles Gray, Merritt Island, FL (US); John Lumpkin, Seabrook, TX (US); Daniel J. Leonard, Seabrook, TX (US); John B. Lauger, Webster, TX (US); Michael James Fuller, Cocoa Beach, FL (US); Brian R. Dunaway, League City, TX (US)

(73) Assignee: The Boeing Company, Chicago, IL (US)

( * ) Notice: Subject to any disclaimer, the term of this patent is extended or adjusted under 35 U.S.C. 154(b) by 912 days.

(21) Appl. No.: 16/588,657

(22) Filed: Sep. 30, 2019

(65) Prior Publication Data

US 2020/0031501 A1    Jan. 30, 2020

Related U.S. Application Data

(62) Division of application No. 15/655,791, filed on Jul. 20, 2017, now Pat. No. 10,562,649.

(51) Int. Cl.
| | |
|---|---|
| *B64G 1/48* | (2006.01) |
| *B01D 53/26* | (2006.01) |
| *B01D 53/82* | (2006.01) |
| *B01D 53/62* | (2006.01) |

(Continued)

(52) U.S. Cl.
CPC .............. *B64G 1/48* (2013.01); *B01D 53/26* (2013.01); *B01D 53/265* (2013.01); *B01D 53/30* (2013.01); *B01D 53/62* (2013.01); *B01D 53/82* (2013.01); *B64G 1/60* (2013.01);

*B01D 2251/302* (2013.01); *B01D 2251/604* (2013.01); *B01D 2253/112* (2013.01); *B01D 2257/504* (2013.01);

(Continued)

(58) Field of Classification Search
CPC . B64G 1/48; B64G 1/50; B64G 1/503; B64G 1/563; B64G 1/506
See application file for complete search history.

(56) References Cited

U.S. PATENT DOCUMENTS

| | | |
|---|---|---|
| 8,424,515 B1 | 4/2013 | Maccallum |
| 2004/0123607 A1 | 7/2004 | Laine et al. |

(Continued)

OTHER PUBLICATIONS

U.S. Patent and Trademark Office; Office Action for U.S. Appl. No. 15/655,791 dated Mar. 15, 2019.

*Primary Examiner* — Donald R Spamer
(74) *Attorney, Agent, or Firm* — Parsons Behle & Latimer

(57) ABSTRACT

An air revitalization system may include a humidity control device configured to remove water vapor from air within a pressurized enclosed volume. The system may further include an inlet duct configured to transport the air from the pressurized enclosed volume to the humidity control device. The system may also include an outlet duct configured to transport the air from the humidity control device to the pressurized enclosed volume. The system may include a sublimator configured to cool the air within the pressurized enclosed volume while generating additional water vapor. The system may further include a vacuum vent duct configured to transport the water vapor from the humidity control device and the additional water vapor from the sublimator to an exterior of the pressurized enclosed volume.

20 Claims, 8 Drawing Sheets

(51) Int. Cl.
 *B64G 1/60* (2006.01)
 *B01D 53/30* (2006.01)

(52) U.S. Cl.
 CPC ...... *B01D 2257/80* (2013.01); *B01D 2258/06* (2013.01); *B01D 2259/4575* (2013.01)

(56) References Cited

U.S. PATENT DOCUMENTS

2013/0255303 A1 10/2013 Sato et al.
2017/0354915 A1 12/2017 O'coin et al.

SYSTEMS AND METHODS FOR AIR REVITALIZATION

CROSS-REFERENCE TO RELATED APPLICATIONS

This application is a divisional of, and claims priority to, U.S. patent application Ser. No. 15/655,791, filed on Jul. 20, 2017, and entitled "Systems and Methods for Air Revitalization," the contents of which are incorporated by reference herein in their entirety.

GOVERNMENT LICENSE RIGHTS

This invention was made with Government support under NNk14MA75C CCtCap Contract awarded by NASA. The government has certain rights in this invention

FIELD OF THE DISCLOSURE

This disclosure relates generally to air revitalization, and in particular to an air revitalization sub-system of a spacecraft environmental controls and life support system.

BACKGROUND

Advances are continually being made in the area of manned space flight and this area of exploration will certainly play an important role in the progress of science over the next several decades and centuries. As the reaches of manned space flight expand, new technologies are needed protect those who venture into the harsh vacuum above, while also economizing resources for longer missions and lowering the costs associated with space travel. With these goals in mind, improvements may be made to current systems and methods for spacecraft environmental controls and life support.

One aspect of environmental control and life support is air revitalization. Oxygen gas, carbon dioxide gas, and water vapor within the breathable air of an enclosed crew cabin of a spacecraft must be maintained at levels to support life. Active air revitalization may help to maintain the levels. Typical spacecraft generally rely on separate systems to remove carbon dioxide and water vapor from the crew cabin. Resources are not typically shared between the systems. Further, typical air revitalization systems rely solely on fans to pass air therethrough without taking advantage of incidental pressure differentials to move air. Additional disadvantages may exist.

SUMMARY

Disclosed are air revitalization systems and methods that mitigate or resolve at least one of the disadvantages described above. In an example, an air revitalization system that extracts water vapor and carbon dioxide gas from a pressurized volume and discharges them to a vacuum vent duct. The air revitalization system may further include a common conduit to transport the water vapor, carbon dioxide, and additional water vapor from a sublimator, to an exterior of a spacecraft. The air revitalization system may also use a duct pressure loss differential between duct branches serving a crew cabin and duct branches serving electronic equipment to power an ejector, thereby increasing airflow to the cabin and increasing air flow across a smoke detector. The air revitalization system may further rely on sheet lithium hydroxide (LiOH) for removing carbon dioxide as opposed to other forms of LiOH.

In an example, an air revitalization system includes a humidity control device configured to remove water vapor from air within a pressurized enclosed volume. The system further includes an inlet duct configured to transport the air from the pressurized enclosed volume to the humidity control device. The system also includes an outlet duct configured to transport the air from the humidity control device to the pressurized enclosed volume. The system includes a sublimator configured to cool the air within the pressurized enclosed volume while generating additional water vapor. The system further includes a vacuum vent duct configured to transport the water vapor from the humidity control device and the additional water vapor from the sublimator to an exterior of the pressurized enclosed volume.

In some examples, the system includes an air ejector configured to reintroduce the air from the outlet duct into the pressurized enclosed volume, the air ejector including an inlet vent, a mixing section, and an exit diffuser, where the air from the outlet duct creates a pressure differential that draws additional air from the pressurized enclosed volume through the inlet vent and into the mixing section, and where the diffuser diffuses a mixture of the air from the outlet duct and the additional air from the pressurized enclosed volume. In some examples, the system includes a smoke detector in proximity to the inlet vent, where the pressure differential draws the additional air across the smoke detector. In some examples, the system includes a carbon dioxide control device positioned upstream from the humidity control device and configured to remove carbon dioxide from the air. In some examples, the carbon dioxide control device includes a sheet lithium hydroxide to remove carbon dioxide.

In some examples, the system includes at least one fan configured to generate airflow through the humidity control device. In some examples, the system includes at least one backup fan, where the at least one fan and the at least one backup fan are operable, together or individually, to generate airflow through the humidity control device. In some examples, the pressurized enclosed volume is a crew cabin of a spacecraft.

In an example, a method for air revitalization includes transporting air from a pressurized enclosed volume to a humidity control device. The method further includes removing water vapor from the air with the humidity control device. The method also includes transporting the air from the humidity control device to the pressurized enclosed volume. The method includes cooling the air within the pressurized enclosed volume while generating additional water vapor at a sublimator. The method further includes transporting the water vapor from the humidity control device and the additional water vapor from the sublimator through a vacuum vent duct to an exterior of the pressurized enclosed volume.

In some examples, the method includes creating a pressure differential at an air ejector using the air, the pressure differential drawing additional air from the pressurized enclosed volume through an inlet vent and into a mixing section, and diffusing a mixture of the air and the additional air into the pressurized enclosed volume. In some examples, the method includes drawing the additional air across a smoke detector in proximity to the inlet vent. In some examples, the method includes removing carbon dioxide from the air at a carbon dioxide control device positioned upstream from the humidity control device. In some examples, the method includes providing sheet lithium hydroxide to remove carbon dioxide from the air. In some examples, the method includes generating airflow through the humidity control device using at least one fan. In some examples, the method includes generating airflow through the humidity control device using at least one backup fan in addition to the at least one fan. In some examples, the pressurized enclosed volume is a crew cabin of a spacecraft.

In an example, an air revitalization system includes an inlet duct configured to transport air from a pressurized enclosed volume. The system further includes a carbon dioxide control device downstream from the inlet duct. The system also includes a humidity control device downstream from the carbon dioxide control device. The system includes at least one fan downstream from the humidity control device. The system further includes a cabin heat exchanger downstream from the at least one fan. The system also includes an outlet duct downstream from the cabin heat exchanger. The system includes an ejector downstream from the outlet duct and configured to reintroduce the air into the pressurized enclosed volume.

In some examples, the ejector includes an inlet vent, where receiving the air at the ejector creates a pressure differential that draws additional air through the inlet vent, a mixing section configured for mixing the air and the additional air, and an exit diffuser. In some examples, the mixing section includes one or more vanes for mixing the air and the additional air. In some examples, the system further includes a smoke detector in proximity to the inlet vent.

Figure 1:
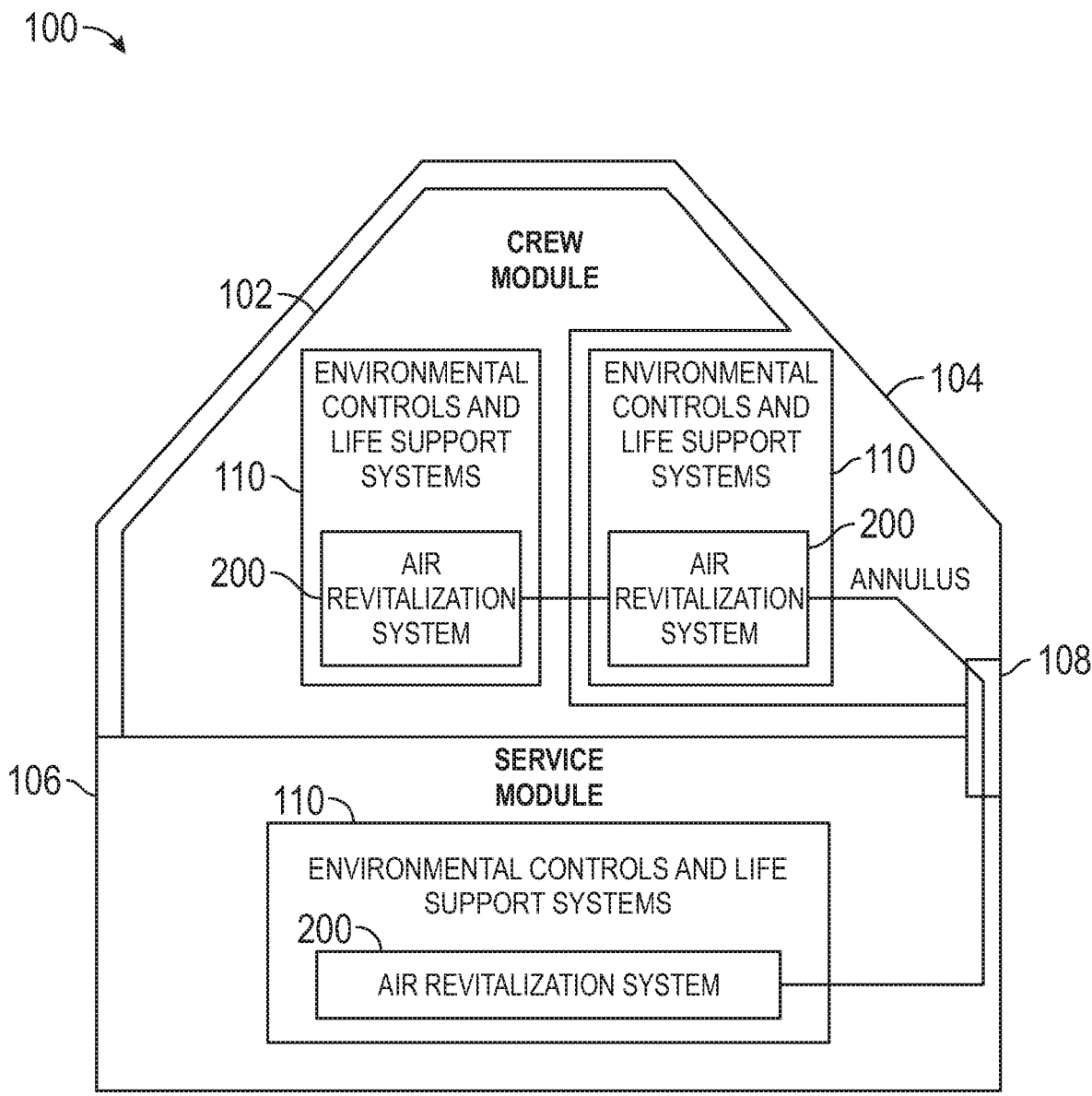
FIG. 1 is a diagram depicting an example of a spacecraft that includes environmental controls and life support systems.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, an example of a spacecraft 100 is depicted. The spacecraft 100 may include a crew module 102 having an annulus 104. The spacecraft 100 may further include a detachable service module 106. An umbilical 108 may provide a link between systems within the crew module 102 and the service module 106.

The spacecraft 100 may include environmental controls and life support systems 110. Further, as part of the environmental controls and life support systems 110, the spacecraft 100 may include an air revitalization system 200. Portions of the environmental controls and life support systems 110 and air revitalization system 200 may be located within the crew module 102, the annulus 104, and the service module 106. While the service module 106 is attached to the crew module 102, the umbilical 108 may provide links between portions of the air revitalization system 200 within the annulus 104 and portions of the air revitalization system 200 within the service module 106. Examples, of the air revitalization system 200 are described further herein.

Figure 2:
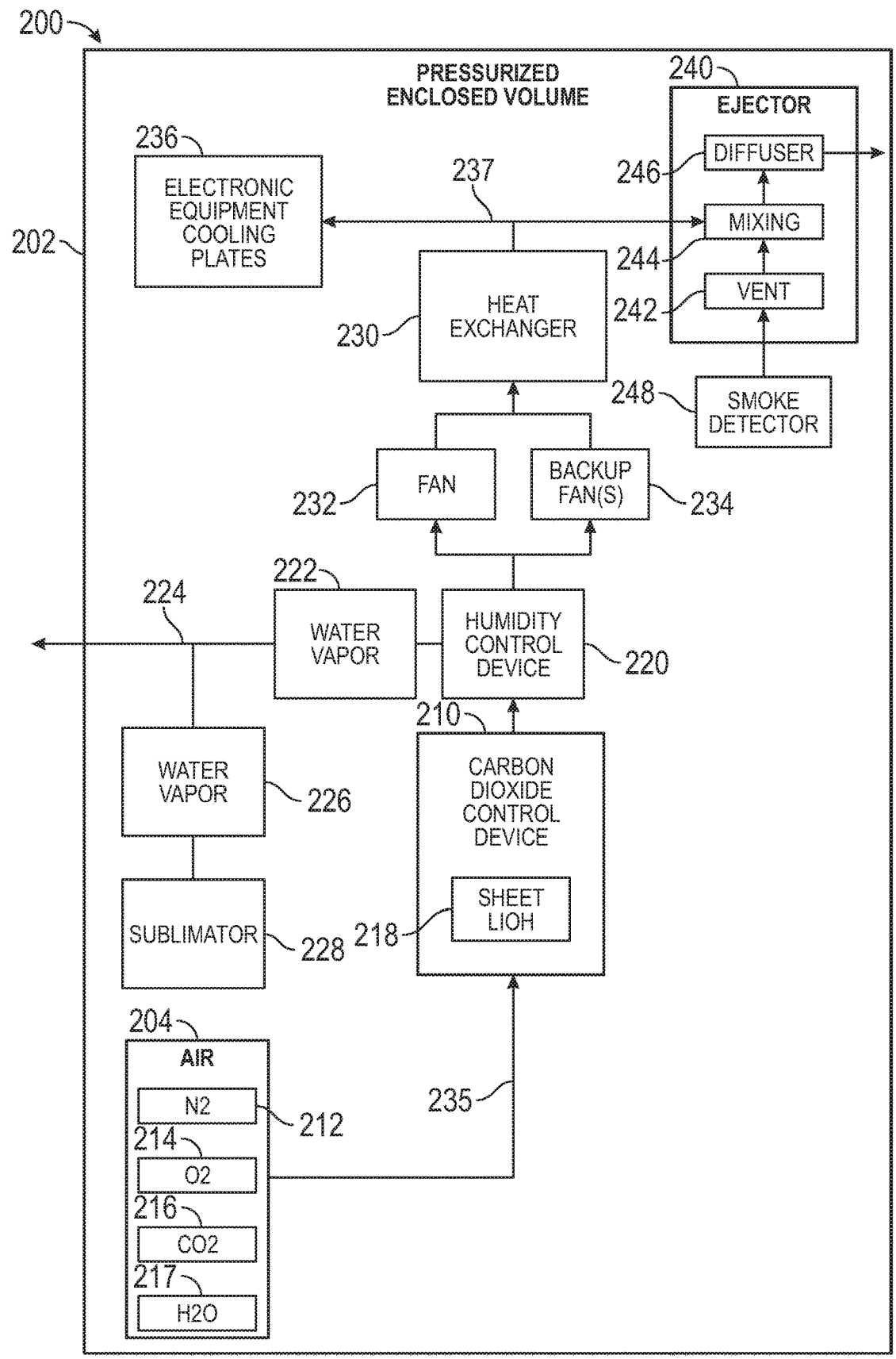
FIG. 2 is a block diagram depicting an example of an air revitalization system.

Referring to FIG. 2, an example of an air revitalization system 200 is depicted. The air revitalization system 200 may be included within a pressurized enclosed volume 202, and may be used to revitalize air 204 within the pressurized enclosed volume 202. The pressurized enclosed volume 202 may be a crew cabin of the crew module 102. In order to revitalize the air 204, the air revitalization system 200 may include a carbon dioxide control device 210, a humidity control device 220, a heat exchanger 230, and an air ejector 240.

The air 204 may be breathable air and may comprise nitrogen 212, oxygen 214, carbon dioxide 216, and water 217. As a crew breathes the air 204, levels of the carbon dioxide 216 may be increased. If unchecked, the carbon dioxide 216 may reach toxic levels, thereby endangering a crew within the pressurized enclosed volume 202. Further, respiration may increase levels of the water 217 (the humidity) within the pressurized enclosed volume 202. As water vapor levels increase, condensation may become more likely thereby increasing the risk that electrical equipment may malfunction. The air revitalization system 200 may mitigate these risks by removing at least a portion of the carbon dioxide 216 from the air and by removing at least a portion of the water 217, thereby dehumidifying the air.

The carbon dioxide control device 210 may include any device that enables the removal of at least a portion of the carbon dioxide 216 from the air 204. In some cases the carbon dioxide control device 210 may be referred to as a scrubber. Carbon dioxide removal in general may rely on lithium hydroxide (LiOH) filters that react with the carbon dioxide 216 to form lithium carbonate, thereby removing the carbon dioxide 216 from the air 204. The lithium carbonate may then be stored or discarded.

The carbon dioxide control device 210 may rely on sheet LiOH 218, as opposed to typical carbon dioxide control devices that may use particulate formulations packed into cartridges. The sheet LiOH 218 may enable simple installation and replacement, as compared to other forms of LiOH.

The humidity control device 220 may include any device capable of performing dehumidification. In other words, the humidity control device 220 may remove water vapor 222 from the air 204. The water vapor 222 may be removed from the pressurized enclosed volume via a vacuum vent duct 224. The vacuum vent duct 224 may also receive additional water vapor 226 from a sublimator 228. Thus, both the water vapor 222 from the humidity control device 220 and the additional water vapor 226 from the sublimator 228 may be transported to an exterior of the pressurized enclosed volume 202 via a single vacuum vent duct 224. In typical spacecraft, sublimators and humidity control devices have independent channels or ducts to remove water vapor from a crew cabin. By sharing the vacuum vent duct 224, the air revitalization system 200 may have a reduced complexity and may, therefore, cost less than typical air revitalization systems. Other advantages may exist.

In order to generate airflow through the carbon dioxide control device 210 and the humidity control device 220, the air revitalization system 200 may include a fan 232. One or more backup fans 234 may also be included for added reliability. The fans 232, 234 may draw the air 204 through an inlet duct 235 where the air 204 may then pass through the carbon dioxide control device 210 and through the humidity control device 220. The air 204 may then be passed to the heat exchanger 230.

The heat exchanger 230 may cool the air using coolant from a temperature control system (not shown) of the spacecraft 100. In general, heat exchangers work by circulating coolant through channels within the heat exchanger to cool fins or another form of heatsink device while passing air through the fins at the same time. A heat transfer is made from the air 204 to the coolant, thereby cooling the air 204. In typical spacecraft, the heat exchanger 230, the humidity control device 220 and the carbon dioxide control device 210 may be associated with individual fans and their own stream of air. By including each of these systems on a single airstream, resources for air revitalization may be conserved.

From the heat exchanger 230, air 204 may pass to electronic equipment cooling plates 236 and to an outlet duct 237. In typical systems it may be desirable to maintain higher air pressure within the electronic equipment cooling plates 236 while using a lower air pressure to blow the air 204 back into the pressurized enclosed volume 202. Typical systems may use a vented panel, or other mechanism, to maintain the air pressure difference. Instead of a vented panel, the system 200 includes the air ejector 240. The air ejector 240 takes advantage of the pressure differential to draw additional air 204 into the air ejector 240, mix the additional air 204 with the air 204 that is already within the system 200 and diffuse the mixture of air 204 back into the pressurized enclosed volume 202. As such, an overall airflow may be increased within the pressurized enclosed volume 202.

The ejector 240 may include a vent 242, a mixing section 244, and a diffuser 246. Additional air 204 from the pressurized enclosed volume 202 may be drawn into the ejector 240 through the vent 242 where it may be mixed in the mixing section 244 with the air 204. The mixed air 204 may then pass through the diffuser 246 to pass back into the pressurized enclosed volume. By drawing additional air 204 in through the vent 242, air circulation proximate to a smoke detector 248 may be increased. The ejector 240 is further described herein.

Figure 3:
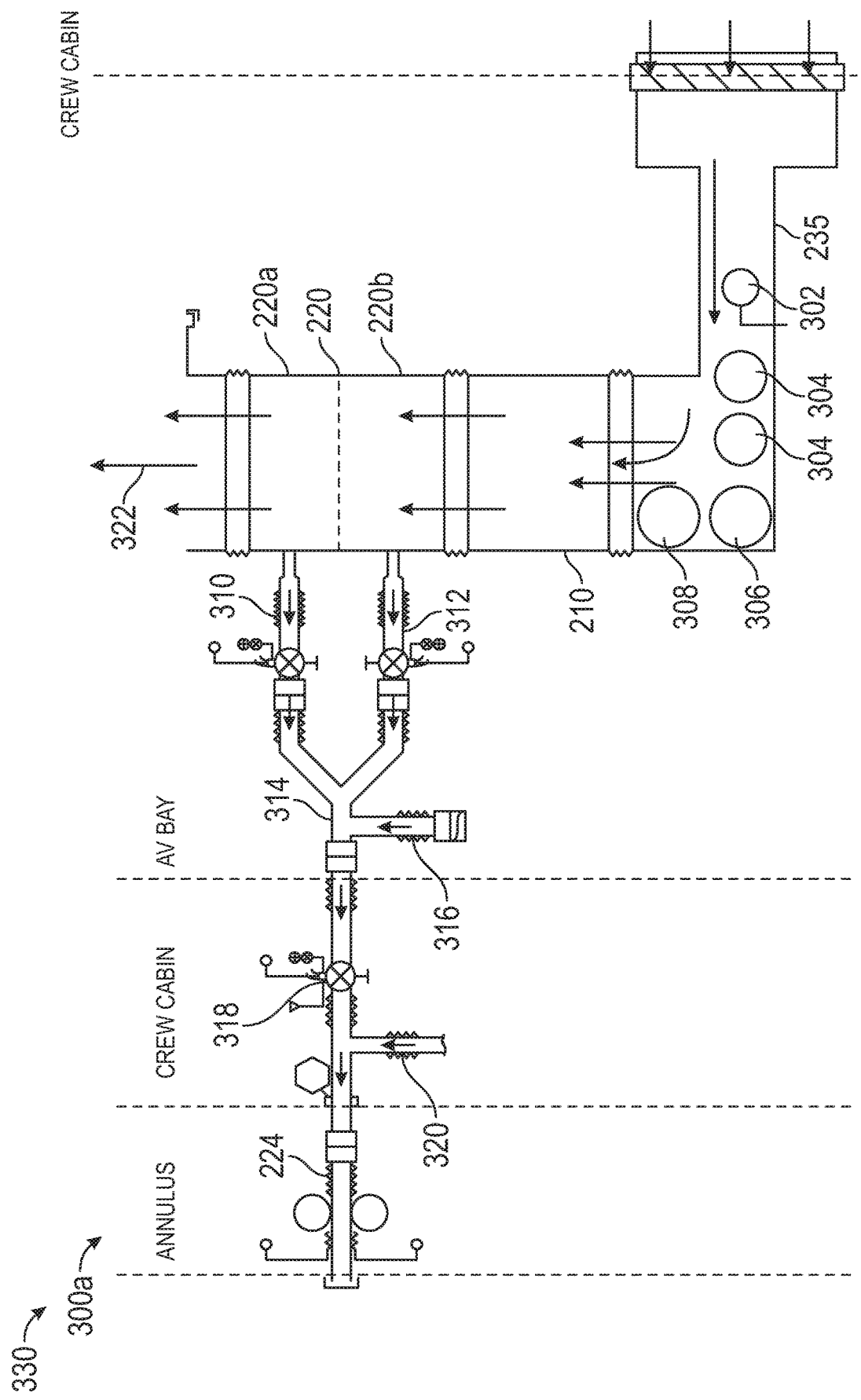
FIG. 3 is a block diagram depicting a portion of an example of an air revitalization system.

Referring to FIG. 3, a first portion 300a of an example of an air revitalization system 300 is depicted. The first portion 300a may include an inlet duct 235. The inlet duct 235 may transport air from a pressurized enclosed volume to a carbon dioxide control device 210 and to a humidity control device 220. The inlet duct 235 may include multiple sensors to provide a crew within the pressurized enclosed volume with information regarding the air. For example, the inlet duct 235 may include a temperature sensor 302, multiple oxygen sensors 304, a carbon dioxide sensor 306, and a water vapor sensor 308. The sensors may enable the crew to change settings associated with the air revitalization system 300 based on readings from the sensors 302, 304, 306, 308.

In the example of FIG. 3, the humidity control device 220 may include a first module 220a and a second module 220b. Both the first module 220a and the second module 220b may remove water vapor from the air received from the inlet duct 235. By having multiple modules, the system 300 may provide for humidity control, even if one of the modules malfunctions. The first module 220a may discharge water vapor into a first duct portion 310. Likewise, the second module 220b may discharge water vapor into a second duct portion 312. The first duct portion 310 and the second duct portion 312 may combine into a combined duct portion 314.

The combined duct portion 314 may receive additional water vapor from a sublimator duct 316. Further, air may be selectively introduced into the combined duct portion 314 from a cabin vent valve duct 320. Each of these sources of water vapor and air may be transported to a vacuum vent duct 224 that releases the water vapor and air to an exterior of a pressurized enclosed volume. The combined duct portion 314 may include an isolation valve 318 to ensure that air that passes to the vacuum vent duct 224 is properly directed to an exterior of the crew cabin. As explained above, in typical spacecraft, sublimators and humidity control devices have independent channels or ducts to remove water vapor from a crew cabin. By sharing the vacuum vent duct 224, the air revitalization system 300 may have a reduced complexity and may, therefore, cost less than typical air revitalization systems. Other advantages may exist.

Figure 4:
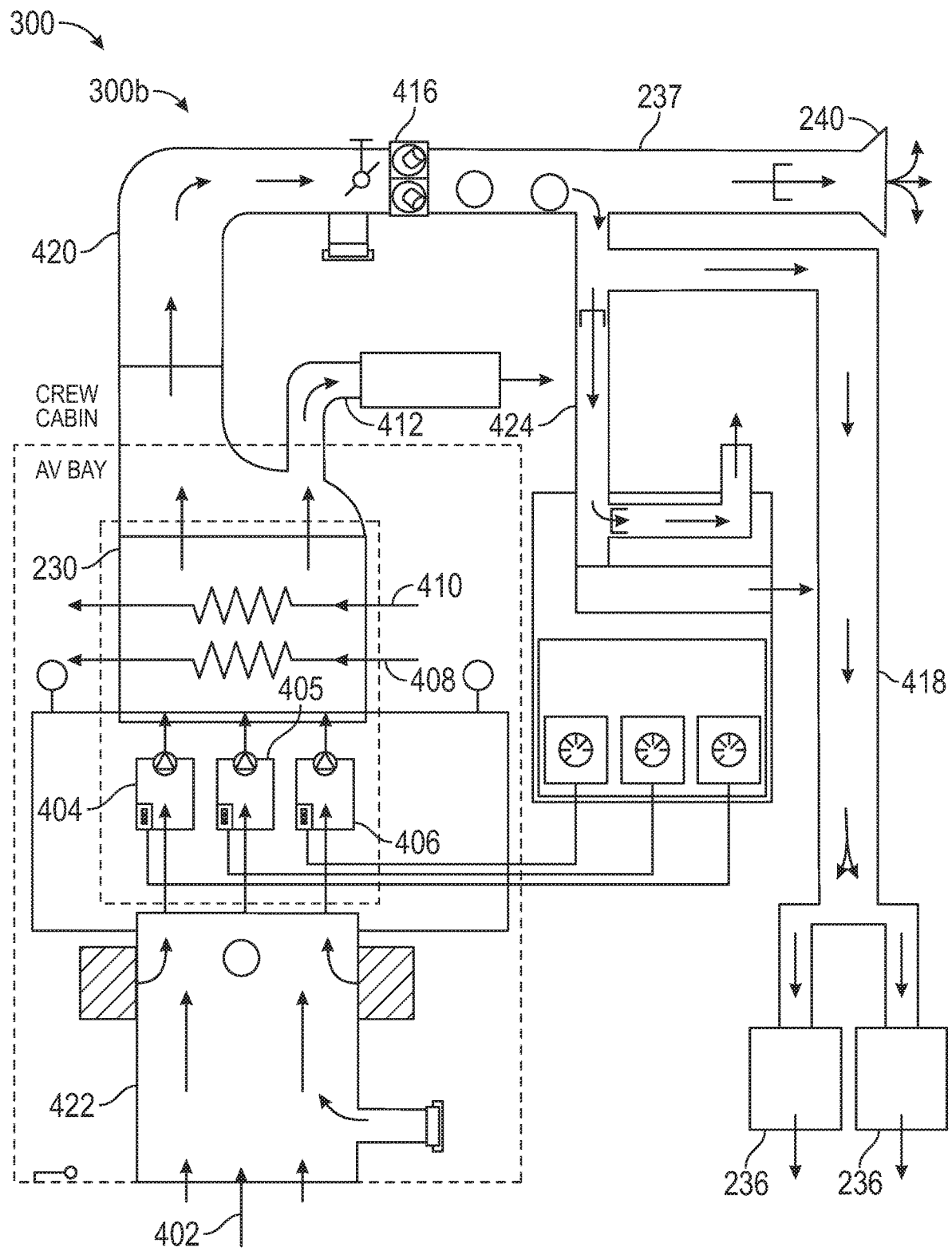
FIG. 4 is a block diagram depicting a portion of an example of an air revitalization system.

After the air has been dehumidified at the humidity control device 220, it may pass to another portion of the system 300, as depicted by the arrow 322. Referring to FIG. 4, a second portion 300b of an example of an air revitalization system 300 is depicted. The second portion 300b may receive air from the first portion 300a as depicted by the arrow 402.

The air may be drawn through an air plenum 422. Circulation through the system 300 may be primarily driven by multiple fans 404-406. The multiple fans 404-406 may include a first fan 404, a second fan 405, and a third fan 406. The fans may be operated collectively or individually. Having multiple fans enables some of the fans 404-406 to be used as backup fans in the event of a malfunction of one of the fans 404-406. Although FIG. 4 depicts three fans, the system 300 may include more or fewer than three.

The fans may move the air into a heat exchanger 230. As described herein, the heat exchanger 230 uses coolant to cool the air. The coolant may be circulated through the heat exchanger 230 via a primary coolant line 408 and a secondary coolant line 410. After the air is cooled, it may be transported via an intermediate duct 420 to an outlet duct 237. A portion of the air may also be transported through a suit duct 412 and used for spacesuit pressurization. The intermediate duct 420 may include orbital diffusers 416 to provide directed airflow to portions of the crew cabin. The outlet duct 237 may transport the air back into the crew cabin through an air ejector 240. The air ejector 240 may help maintain air pressure within the outlet duct 237 in order to provide airflow through a branch duct 418 to a set of cold plates 236, and to maintain air pressure through another branch duct 424 that directs the air to other systems.

Figure 5:
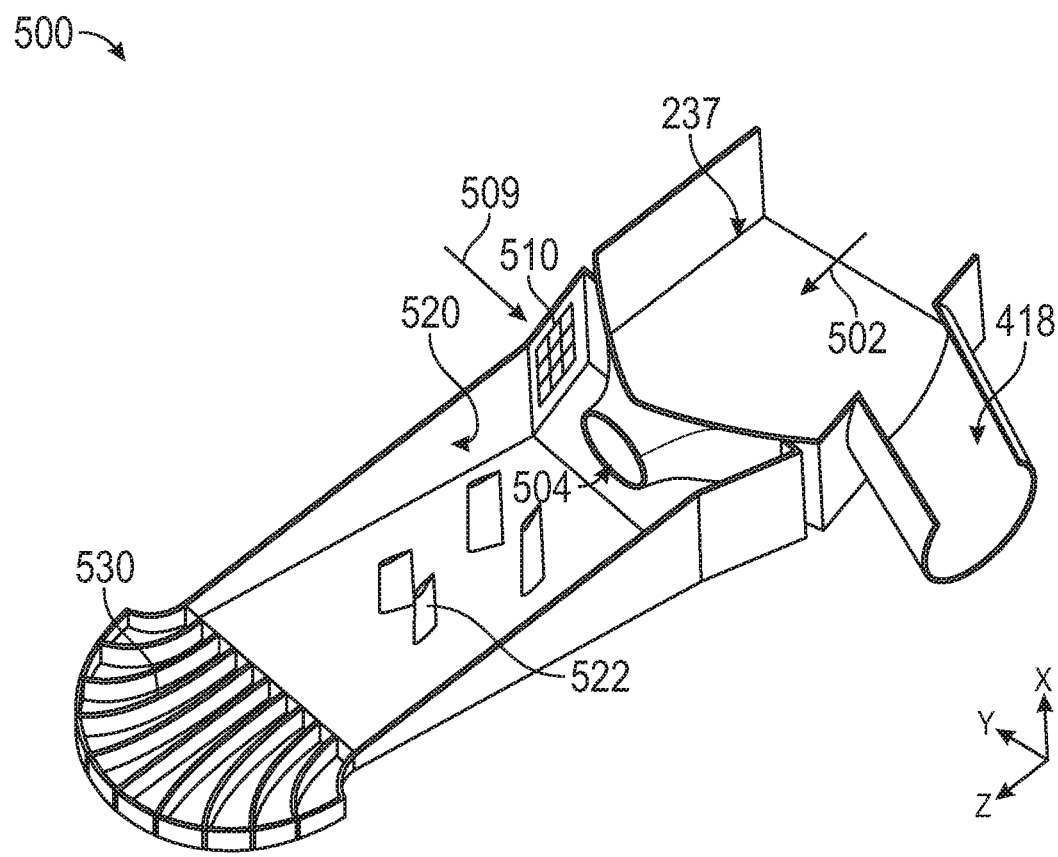
FIG. 5 is a diagram depicting an example of an air ejector for an air revitalization system.

Referring to FIG. 5, an example of an air ejector 500 for use with the systems disclosed herein is depicted. The air ejector 500 may include an inlet vent 510, a mixing section 520, and an exit diffuser 530. As described herein, air 502 may be received into an outlet duct 237. The air 502 may pass through an opening 504 into the mixing section 520. In order to maintain airflow through a branch duct 418, the opening 504 may be smaller than the outlet duct 237. As depicted in FIG. 5, the opening 504 may further be shaped to guide the air 502 into a narrow stream as it enters the mixing section 520. As the air stream enters the mixing section 520, it creates a pressure differential that draws additional air through the inlet vent 510. The additional air is mixed with the air stream within the mixing section 520. The mixing section 520 may include one or more vanes 522 to assist with mixing the air. Then, the air passes through the diffuser 530 and into the crew cabin.

Figure 6:
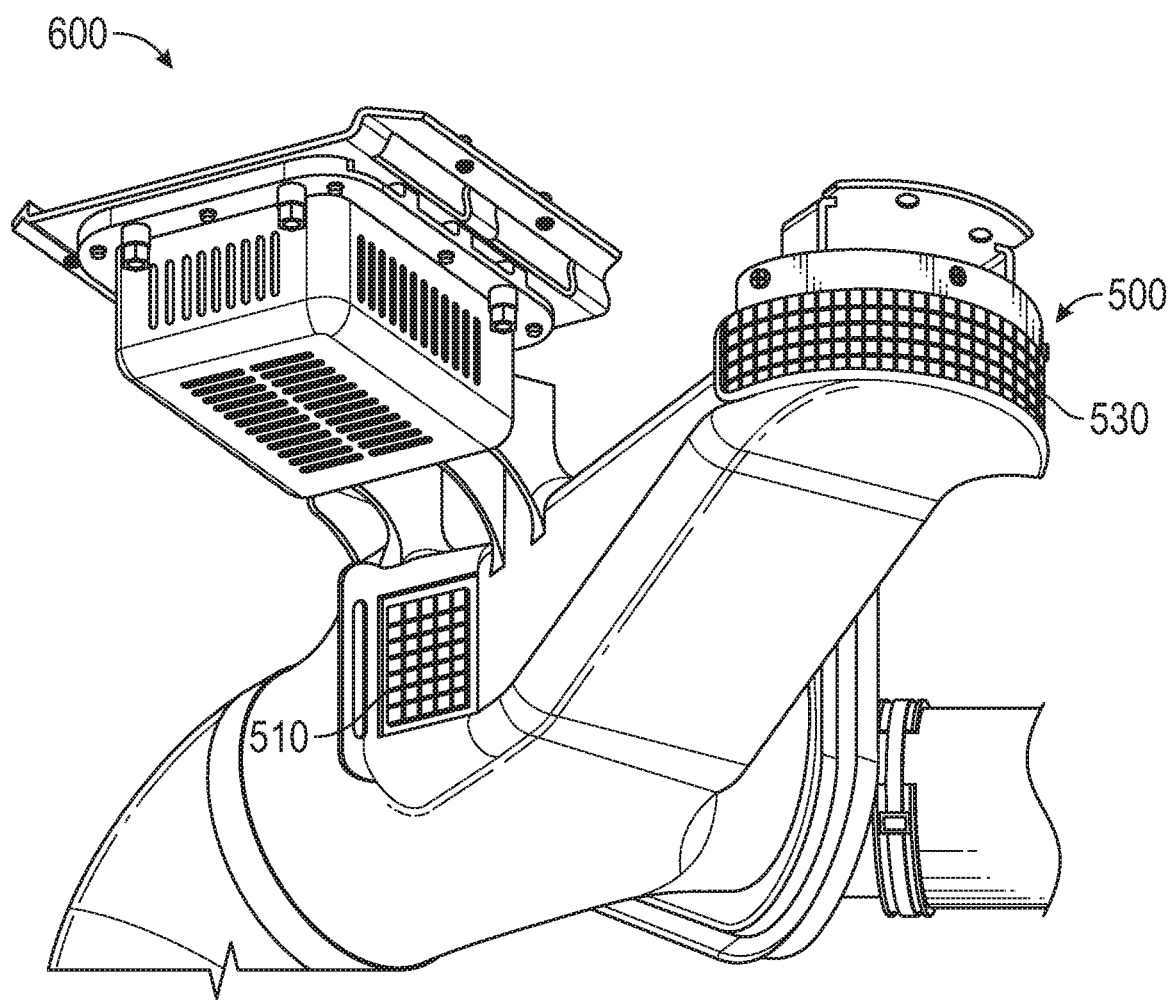
FIG. 6 is a diagram depicting an example of an air ejector for an air revitalization system in proximity to a smoke detector.

By using the air ejector 500, additional airflow may be generated within an enclosed crew cabin based on pressure that is already present within the air revitalization system, without including additional fans. As depicted in FIG. 6, another benefit of the air ejector 500 is that it may create additional airflow at a smoke detector 600 in proximity to the inlet vent 510. By creating the additional airflow, the smoke detector 600 may be better able to detect a smoke hazard within the crew cabin, resulting in greater safety to a crew. Other benefits may exist.

Figure 7:
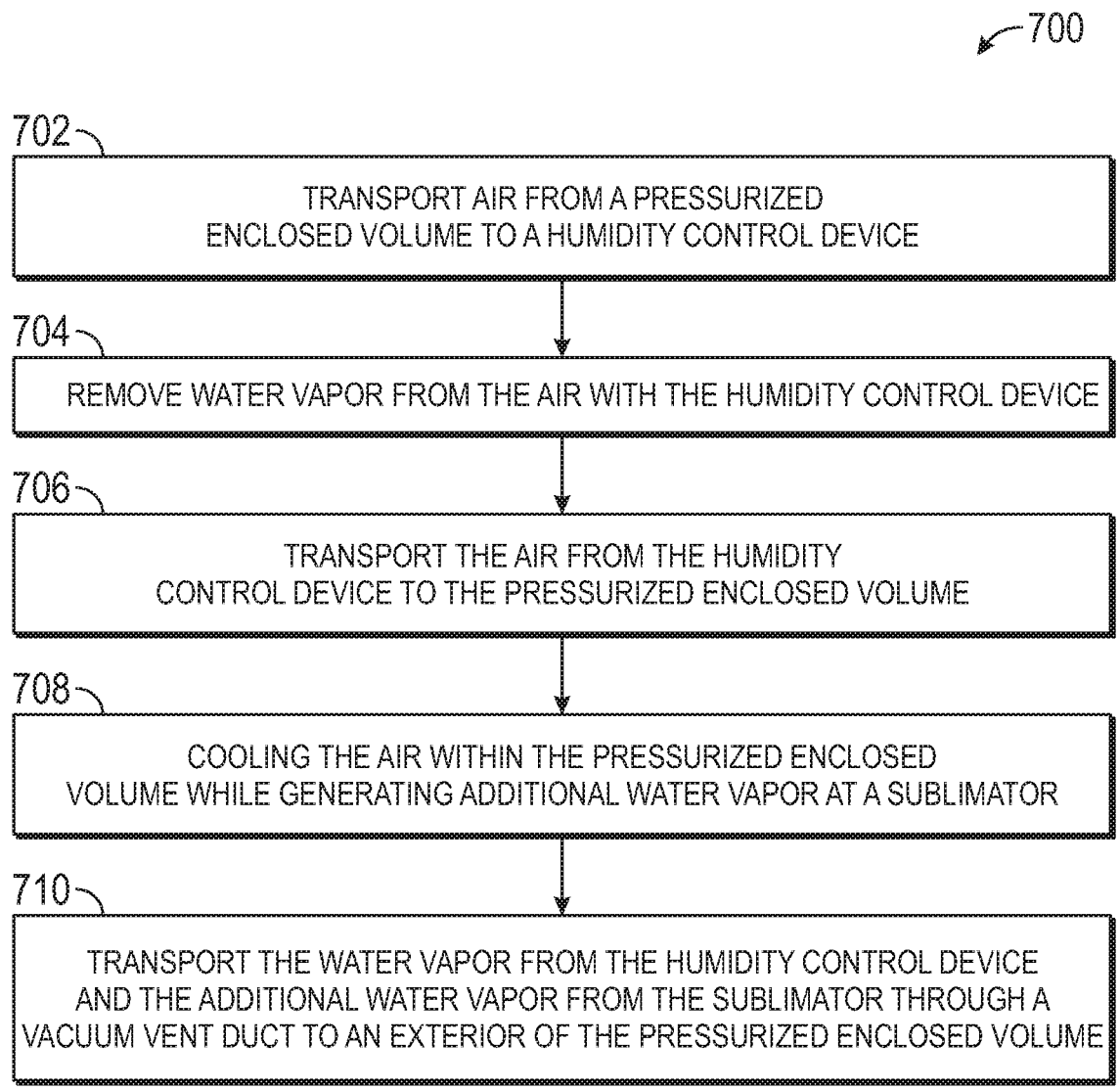
FIG. 7 is a flow diagram of an example of a method for air revitalization.

Referring to FIG. 7, an example of a method 700 for air revitalization is depicted. The method 700 may include transporting air from a pressurized enclosed volume to a humidity control device, at 702. For example, the air 204 may be transported from the pressurized enclosed volume 202 to the humidity control device 220.

The method 700 may further include removing water vapor from the air with the humidity control device, at 704. For example, the water vapor 222 may be removed from the air 204 with the humidity control device 220.

The method 700 may also include transporting the air from the humidity control device to the pressurized enclosed volume, at 706. For example, the air 204 may be transported from the humidity control device 220 to the pressurized enclosed volume 202.

The method 700 may include cooling the air within the pressurized enclosed volume while generating additional water vapor at a sublimator, at 708. For example, the air 204 may be cooled while generating the additional water vapor 226 at the sublimator 228.

The method 700 may further include transporting the water vapor from the humidity control device and the additional water vapor from the sublimator through a vacuum vent duct to an exterior of the pressurized enclosed volume, at 710. For example, the water vapor 222 and the additional water vapor 226 may be transported through the vacuum vent duct 224 to an exterior of the pressurized enclosed volume 202.

A benefit of the method 700 is that resources, such as the vacuum vent duct 224 may be shared by both the humidity control device 220 and the sublimator 228, thereby simplifying the process of air revitalization and also conserving resources devoted to and costs associated with air revitalization. Other advantages may exist.

Figure 8:
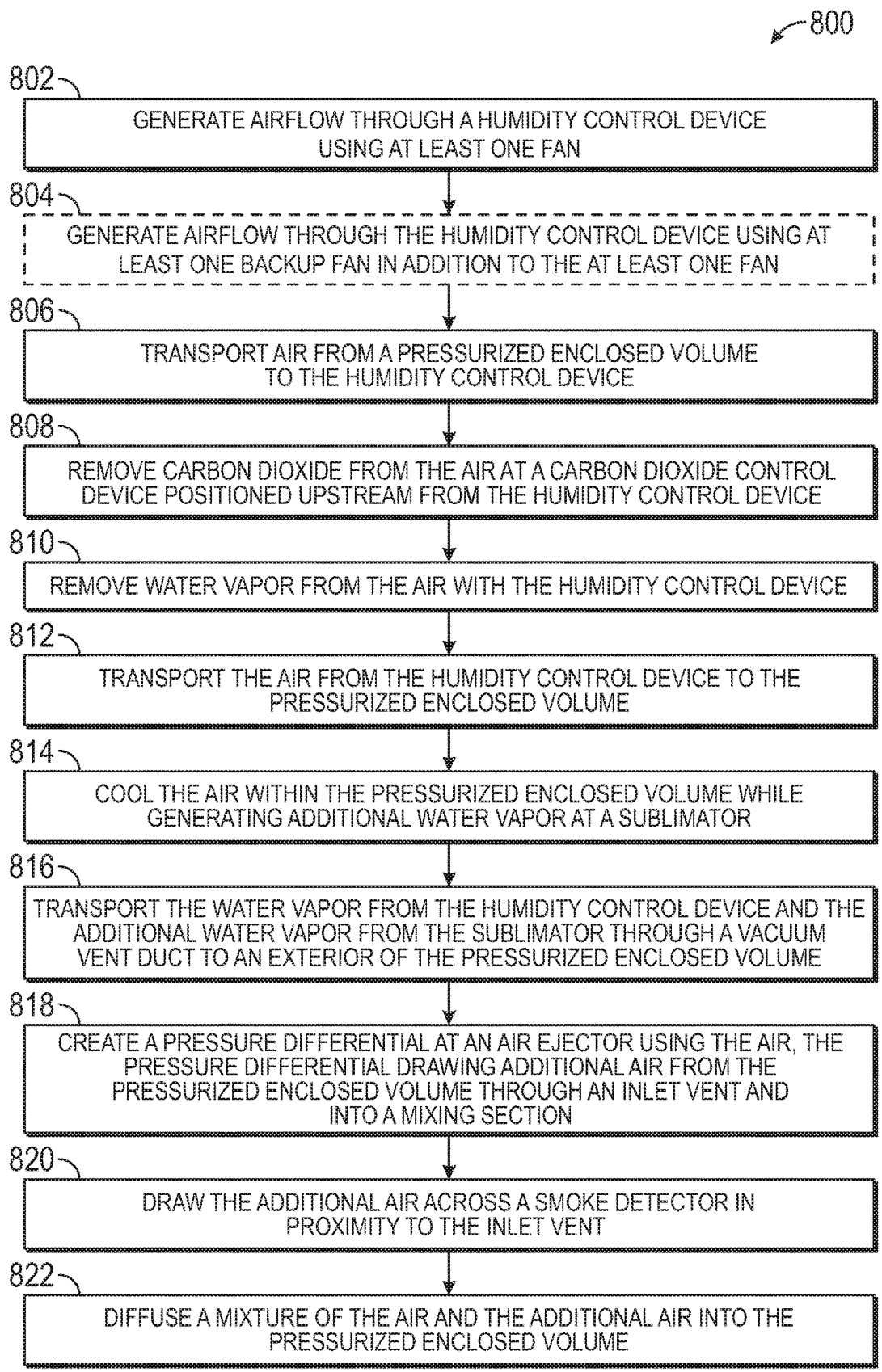
FIG. 8 is a flow diagram of an example of a method for air revitalization.

Referring to FIG. 8, an example of a method 800 for air revitalization is depicted. The method 800 may include generating airflow through a humidity control device using at least one fan, at 802. For example, airflow may be generated through the humidity control device 220 using the fan 232.

The method 800 may optionally include generating airflow through the humidity control device using at least one backup fan in addition to the at least one fan, at 804. For example, airflow may be generated through the humidity control device 220 using the backup fan 234 in addition to the fan 232.

The method 800 may include transporting air from a pressurized enclosed volume to the humidity control device, at 806. For example, the air 204 may be transported from the pressurized enclosed volume 202 to the humidity control device 220.

The method 800 may include removing carbon dioxide from the air at a carbon dioxide control device positioned upstream from the humidity control device, at 808. For example, at least a portion of the carbon dioxide 216 may be removed from the air 204 at the carbon dioxide control device 210.

The method 800 may include removing water vapor from the air with the humidity control device, at 810. For example, the water vapor 222 may be removed from the air 204 with the humidity control device 220.

The method 800 may include transporting the air from the humidity control device to the pressurized enclosed volume, at 812. For example, the air 204 may be transported from the humidity control device 220 to the pressurized enclosed volume 202.

The method 800 may include cooling the air within the pressurized enclosed volume while generating additional water vapor at a sublimator, at 814. For example, the air 204 may be cooled at the sublimator 228 generating the additional water vapor 226.

The method 800 may include transporting the water vapor from the humidity control device and the additional water vapor from the sublimator through a vacuum vent duct to an exterior of the pressurized enclosed volume, at 816. For example, the water vapor 222 may be transported from the humidity control device 220 and the additional water vapor 222 may be transported from the sublimator 228 through the vacuum vent duct 224 to an exterior of the pressurized enclosed volume 202.

The method 800 may include creating a pressure differential at an air ejector using the air, the pressure differential drawing additional air from the pressurized enclosed volume through an inlet vent and into a mixing section, at 818. For example, a pressure differential may be created at the air ejector 500 using the air 502, the pressure differential drawing the additional air 509 from the pressurized enclosed volume through the inlet vent 510 and into the mixing section 520.

The method 800 may include drawing the additional air across a smoke detector in proximity to the inlet vent, at 820. For example, the additional air 509 may be drawn across the smoke detector 600.

The method 800 may include diffusing a mixture of the air and the additional air into the pressurized enclosed volume, at 822. For example, the mixture of the air 502 and the additional air 509 may be diffused into the pressurized enclosed volume 202.

Although various examples have been shown and described, the present disclosure is not so limited and will be understood to include all such modifications and variations as would be apparent to one skilled in the art.

What is claimed is:

1. A method for air revitalization, the method comprising:
   transporting air from a pressurized enclosed volume to a humidity control device;
   removing water vapor from the air with the humidity control device;
   transporting the air from the humidity control device to the pressurized enclosed volume;
   cooling the air within the pressurized enclosed volume while generating additional water vapor at a sublimator;
   transporting the water vapor from the humidity control device and the additional water vapor from the sublimator through a vacuum vent duct to an exterior of the pressurized enclosed volume;

creating a pressure differential at an air ejector using the air, wherein the pressure differential draws additional air from the pressurized enclosed volume through an inlet vent and into a mixing section; and diffusing a mixture of the air and the additional air into the pressurized enclosed volume.

2. The method of claim 1, further comprising:

drawing the additional air across a smoke detector in proximity to the inlet vent.

3. The method of claim 1, further comprising:

removing carbon dioxide from the air at a carbon dioxide control device positioned upstream from the humidity control device.

4. The method of claim 3, further comprising providing sheet lithium hydroxide to remove the carbon dioxide from the air.

5. The method of claim 1, further comprising:

generating airflow through the humidity control device using at least one fan.

6. The method of claim 5, further comprising:

generating airflow through the humidity control device using at least one backup fan in addition to the at least one fan.

7. The method of claim 1, wherein the pressurized enclosed volume is a crew cabin of a spacecraft.

8. An air revitalization method comprising:

transporting air from a pressurized enclosed volume via an inlet duct to a carbon dioxide control device downstream from the inlet duct;

removing carbon dioxide from the air at the carbon dioxide control device;

transporting the air from the carbon dioxide control device to a humidity control device downstream from the carbon dioxide control device;

removing water vapor from the air with the humidity control device;

using at least one fan downstream from the humidity control device to generate airflow through the carbon dioxide control device and the humidity control device;

changing a temperature of the air using a cabin heat exchanger downstream from the at least one fan;

transporting the air through an outlet duct downstream from the cabin heat exchanger; and reintroducing the air into the pressurized enclosed volume via an ejector downstream from the outlet duct, wherein receiving the air at the ejector creates a pressure differential that draws additional air through an inlet vent of the ejector.

9. The method of claim 8, further comprising:

mixing the air and the additional air using one or more vanes in a mixing section of the ejector.

10. The method of claim 8, further comprising:

detecting smoke using a smoke detector in proximity to the inlet vent.

11. The method of claim 10, wherein the pressure differential draws the additional air across the smoke detector.

12. The method of claim 8, further comprising:

providing sheet lithium hydroxide in the carbon dioxide control device to remove the carbon dioxide from the air.

13. The method of claim 8, further comprising:

using at least one backup fan together with the at least one fan to generate the airflow.

14. The method of claim 8, wherein the pressurized enclosed volume is a crew cabin of a spacecraft.

15. An air revitalization method comprising:

transporting air from a pressurized enclosed volume to a humidity control device;

removing water vapor from air at the humidity control device; and reintroducing the air into the pressurized enclosed volume via an air ejector comprising an inlet vent, a mixing section, and an exit diffuser, wherein the air creates a pressure differential that draws additional air from the pressurized enclosed volume through the inlet vent and into the mixing section, and wherein the exit diffuser diffuses a mixture of the air and the additional air from the pressurized enclosed volume.

16. The method of claim 15, further comprising:

cooling the air within the pressurized enclosed volume while generating additional water vapor at a sublimator; and transporting the water vapor from the humidity control device and the additional water vapor from the sublimator through a vacuum vent duct to an exterior of the pressurized enclosed volume.

17. The method of claim 15, further comprising:

mixing the air and the additional air using one or more vanes in the mixing section of the air ejector.

18. The method of claim 15, further comprising:

drawing the additional air across a smoke detector in proximity to the inlet vent.

19. The method of claim 15, further comprising:

removing carbon dioxide from the air at a carbon dioxide control device.

20. The method of claim 15, wherein the pressurized enclosed volume is a crew cabin of a spacecraft.

* * * * *